United States Patent [19]
Krider

[11] 3,940,607
[45] Feb. 24, 1976

[54] PHOTO-ELECTRIC LIGHTNING DETECTOR APPARATUS

[75] Inventor: Edmund Philip Krider, Tucson, Ariz.

[73] Assignee: The United States of America as represented by the Secretary of the Navy, Washington, D.C.

[22] Filed: Dec. 9, 1974

[21] Appl. No.: 531,010

[52] U.S. Cl............ 250/209; 250/211 R; 250/214 R; 250/216; 356/152
[51] Int. Cl.$^2$................................................ H01J 39/12
[58] Field of Search........ 250/206, 208, 209, 211 R, 250/211 J, 214 R, 216; 356/138, 152

[56] References Cited
UNITED STATES PATENTS

| | | | |
|---|---|---|---|
| 3,147,380 | 9/1964 | Buckingham et al. | 250/214 R X |
| 3,226,557 | 12/1965 | Goodman | 250/216 X |
| 3,515,879 | 6/1970 | Weischedel et al. | 250/208 X |
| 3,801,821 | 4/1974 | Sharpe et al. | 250/209 |

*Primary Examiner*—Alfred E. Smith
*Assistant Examiner*—E. R. LaRoche
*Attorney, Agent, or Firm*—Richard S. Sciascia; Paul N. Critchlow

[57] ABSTRACT

The apparatus is used primarily to monitor the occurrence of lightning discharges in the vicinity of a known objective such, for example, as a large rocket launch tower or other object which might be detrimentally affected by the lightning. A continuous, linear single-axis, position-sensing photodiode is deployed a predetermined distance from the objective and an optical objective lens focuses a relatively narrow field of view, such as a 40° field on the photodiode. The arrangement is such that the image of a lightning discharge occurring within the field of view is in the form of a focussed narrow-line channel bisecting the length of the photodiode at varying locations dependent upon the actual location of the lightning discharges itself. In a conventional manner, the photodiode produces two signal outputs each corresponding in magnitude to the particular location of the bisecting channel image of the lightning. Using the fractional distribution of these signal outputs, the angle to discharge ($\psi$) readily can be computed using a simple analog circuits or other desired means. This angle to discharge determines the proximity of the discharge to the object to be monitored. By use of an array of photodiodes spaced one from the other at a known distance, the vertical speed of propagation of the lightning can be determined, this speed being a function of the time lag or delay in the outputs produced by each of the spaced photodiodes.

3 Claims, 4 Drawing Figures

PHOTO-ELECTRIC LIGHTNING DETECTOR APPARATUS

BACKGROUND OF THE INVENTION

The present invention relates generally to photodiode detector means for producing a plurality of signal outputs when activated by the impingement of optical radiation. More specifically, the invention relates to photo electric lightning detectors using single-axis photodiodes to monitor lightning discharges.

Present methods for locating lightning discharges are based on detecting electromagnetic field or optical transients produced by the discharge. Crossed-loop direction finders and other versions of sferic detectors are in common use as are cameras and T.V. systems. Unfortunately, the complex nature of the emitting source and the rather long wavelengths involved limit the accuracy of the electronic field techniques. Photography can provide accurate angular information but, again, it is limited in time resolution and in the rather slow processing of the data. Additionally, photography suffers during daylight because of film exposure. Sophisticated T.V. systems with video recording have fair accuracy and time-resolution but can become rather expensive and cumbersome particularly when used in field experiments.

Usually, systems of these various types are employed for the purpose of accurately determining the actual location of lightning strokes under study. However, in other situations, such as those presently contemplated, it becomes highly desirable to monitor some object or location to determine whether a lightning discharge has occurred in its vicinity and, if so, the proximity of the discharge to the object. For example, it is quite desirable to monitor large rocket launch towers because, obviously, such towers may well be detrimentally affected by lightning and, if so, immediate repairs must be made. Other targets such as satellites, or flammable targets such as oil tanks or forests are vulnerable to lightning discharges so as to benefit by constant monitoring. However, acceptable monitoring of these objects should be accomplished in real time and also with a highly precise angular resolution. As already indicated, present methods are especially deficient in these regards.

It is recognized that photodiode detectors of the type generally under consideration are known devices and, further, that they have been used in conjunction with a focusing lens to locate or determine the position of a source of light. For example, U.S. Pat. No. 3,800,146 issued Mar. 26, 1974 to Brunkhorst, Carr and Dueker describes these light sensitive detectors in some detail and further identifies other U.S. Patents in which the detectors are disclosed. These detectors, however, mostly are of a type producing quadrature outputs as opposed to the single-axis detector presently used.

OBJECTS OF THE PRESENT INVENTION

One of the objects of the invention is to provide a simple, inexpensive detector apparatus for monitoring known objectives to determine in real time and with a high degree of accuracy the occurrence of the lightning discharge in the vicinity of the objective.

A further object is to provide detecting apparatus which has a wide dynamic range and which is capable of being used during daylight or at night.

Yet another object is to provide a photodiode detector system for monitoring lightning discharges, the photodiode of the system being capable of producing signal output information from which the relative location of the discharge can correctly be ascertained using simple analog circuitry.

Another important object is to provide detector apparatus of the type under consideration which achieves unusually high angular resolution well in excess of 0.01° and which has a time resolution of about $10^{-3}$ seconds.

Other objects are to provide a monitoring detector apparatus capable of precisely determining the relative location of a lightning discharge as well as the intensity of the discharge and its vertical speed of propagation.

Other objects and their attendant advantages will become more apparent in the ensuing description.

BRIEF DESCRIPTION OF THE DRAWINGS

The present invention is illustrated in the accompanying drawings of which FIG. 1 schematically illustrates the deployment of the present detecting system and further identifies parameters and data used to produce the desired results.

DETAILED DESCRIPTION OF THE INVENTION

Figure 1:
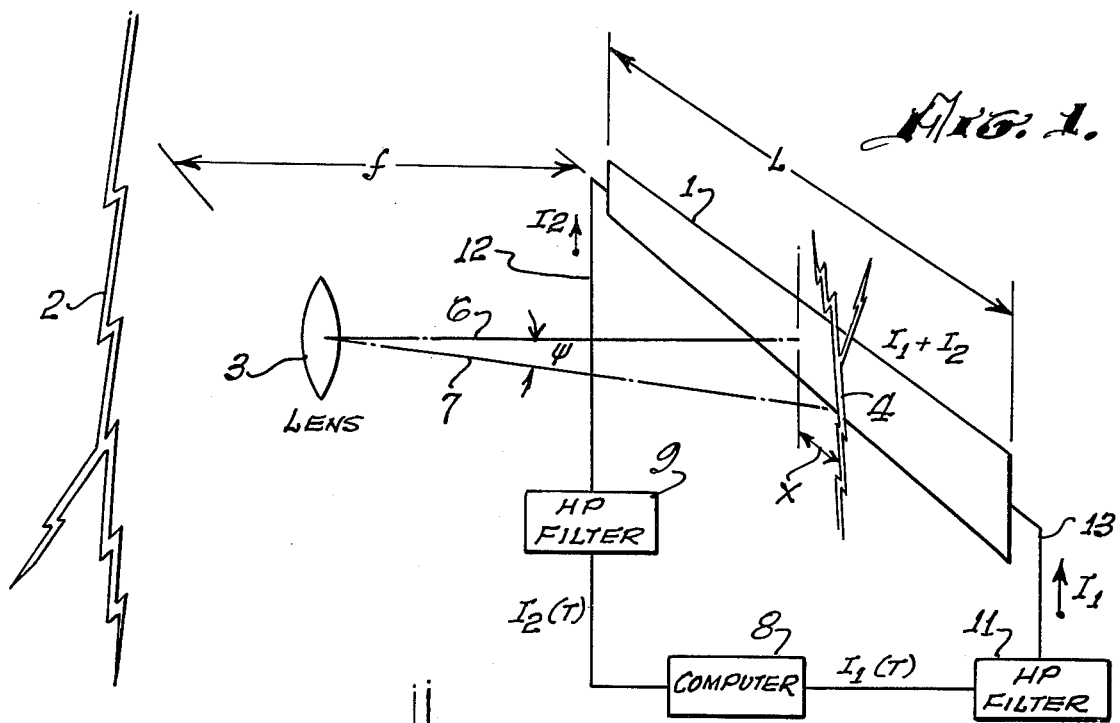

Referring to the drawings, the system illustrated in FIG. 1 generally includes a continuous single-axis, position sensing photodiode member 1 on which the image of a lightning discharge 2 is focused by an objective lens 3. As has been indicated, the present system is intended primarily to monitor particular objectives, such as the critical launching towers, oil tanks, satellites, forests, etcetera to ascertain and precisely locate the occurrence of lightning discharges in the vicinity of these objects. For this purpose, lens 3 may be of a type having a field of view of 30°–40°, more or less and, manifestly, the lens view is centered on the critical object to be monitored. Also, according to well-known optical practices, the lens is disposed at a focal length F from the single-axis photodiode detector and, since the intention is to monitor a known critical object, the range or distance of the object is a known factor.

Photodiode 1 is an elongate, wafer-like single-axis detector member, preferably of a continuous type as opposed to the discrete types used in some applications. Such photodiodes are known commercial products identified to some extent in the references which have been provided. In the present system, a commercial photodiode known as L SC-4 manufactured by United Detector Technology, Inc., is employed. When such a diode is used with a lens having a 40° field of view, it has been found to have excellent angular resolution within a thousandth of a degree and further, since this diode is a low power unit, the system can be deployed for many months of continuous operation using conventional 90 volt batteries.

As is known, these single-axis photodiodes produce a pair of signal outputs or currents identified in FIG. 1 as $I_1$ and $I_2$ and the fractional distribution of these output currents is wholly dependent upon the particular location of the image of lightning discharge 2. Thus, as shown in FIG. 1, discharge 2 produces an image 4 on the photodiode and, to permit the desired accuracy, the orientation of the diode and lens relative to the discharge are such that the image appears as a focused, narrow-line channel bisecting the length (L) of the photodiode at a particular distance from the center of length (L). This distance is a measure of the particular location of the lightning discharge in the sky. The angle to discharge of the lightning discharge, represented by angle $\psi$ (FIG. 1) is formed by projections 6 and 7. Projection 6 is normal to the plane of the photodiode and projection 7 extends to the optical center of the discharge image 4. The distance of image 4 from the center line of the photodiode is represented by factor X as also shown in FIG. 1.

Using simple triangulation procedures, it readily should be apparent that distance X equals $$\frac{L}{2} \frac{(I_1 - I_2)}{(I_1 + I_2)}$$

The angle to discharge $\psi$ then can be expressed by the following:

$$\psi = \tan^{-1} \frac{X}{f} = \tan^{-1} \left[ \frac{L}{2f} \frac{I_1 - I_2}{I_1 + I_2} \right]$$

Consequently, the fractional distribution of the two photo currents, $I_1$ and $I_2$, can be used to determine the location of a lightning image on the detector as well as the angle to discharge $\psi$. Further, the total light intensity at the detector is proportional to $I_1 + I_2$. The angle to discharge, $\psi$, is an accurate measure of the proximity of the lightning to the particular object being monitored.

One point to be particularly noted with regard to the system shown in FIG. 1 is that the information needed to locate the lightning is presented in the form of two analog signals which are easily interfaced to a data acquisition system, such as that identified by numeral 8 in FIG. 1 and further, that such a system permits the location to be analyzed in substantially real time. The unusually high angular resolution achieved by the present arrangement is one of the principal benefits derived from its use. Of course, as in any such arrangements, there are certain qualifications imposed on theoretical resolution capability. Thus, the well-known light-scattering phenomenon experienced in lightning measurements can produce shifts in the lightning position. Also component imperfections may introduce errors although these usually can be reduced or eliminated by laboratory calibration.

Another important feature is the need to limit the information provided to system 8 to the extent that this information will be representative only of the optical transients of the lightning discharge as opposed to undesired background signals. This purpose is accomplished by the use of high pass filters 9 and 11 provided in each of the signal output circuits 12 and 13. Although, many types of filtering components can be used for this purpose, it is preferred to use a simple capacitor type filter having a value of about 1 microfarad. Data acquisition system 8, of course, may be in the form of any conventional analog computer although digital techniques can be substituted if so desired. As to other alternatives, it also should be reasonably clear that various types and geometries of single-axis photodiodes can be combined with lenses of various types and focal lengths to produce wide or narrow fields of view or to vary the angular resolution. Further, as will be described with reference to FIGS. 2 and 4, other arrangements and orientations can be employed to permit other parameters of the lightning discharge to be analyzed. For example, it may be desired to use two detectors spaced a known distance D one from the other. Such an arrangement can be used to spatially locate the lightning discharge using triangular geometries similar to those described in a copending patent application entitled "All-Sky Photoelectric Lightning Detector Apparatus", this application being filed by the present inventor and presently being identified as Ser. No. 530,643.

Figure 2:
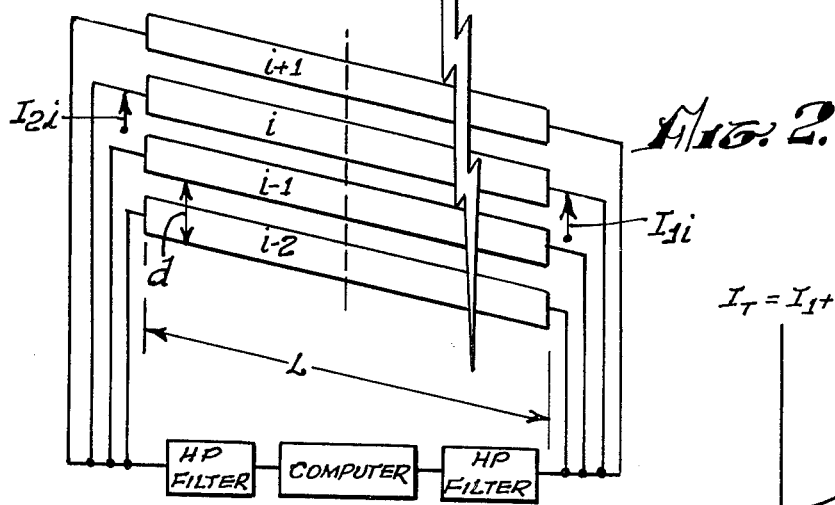
FIG. 2 illustrates a modification of the FIG. 1 system utilizing an array of photodiode detectors deployed to permit a determination of the vertical speed of propagation of the lightning.

FIG. 2 illustrates an arrangement enabling the determination of the vertical speed of propagation of the lightning discharge. As shown in a rather generalized manner, this arrangement employs an array of two or more horizontal, single-axis, position-sensing diodes which may be the same type of photodiodes previously described with reference to FIG. 1. The array, as shown, is mounted in a plane behind a single lens such as lens 3 of FIG. 1 and the lens, as well as the plane of the photodiodes, are oriented to permit imaging of the field of view on each of the photodiodes. Again, the objective target, such as the critical tower or tank, is at the focal center of the photodiode so that the fractional distribution of the output currents can be used to determine the angle to discharge $\psi$. The important factor is that the array of photodiodes are disposed a distance d one from the other as shown in FIG. 2. Consequently, any vertically-oriented lightning discharge 2 will have the resulting narrow-line channel successively impinging upon each of the spaced photodiodes and the successive impingement will be produced with a time lag or delay of $\Delta t$. In other words, channel image 4 of the lightning discharge also will propagate vertically at a speed determined by the vertical speed of propagation of the lightning itself.

Figure 3:
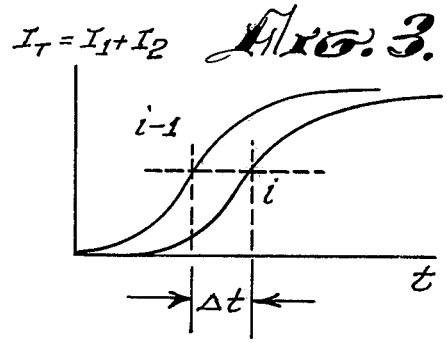
FIG. 3 is a plot of the total output currents of a pair of the array of detectors shown in FIG. 2.

When such an array arrangement is employed, it first will be apparent that the location of the lightning discharge relative to the target, in other words, angle $\psi$, can be determined using the relationships previously given by equations 1 and 2 with reference to FIG. 1. The angular velocity of the lightning is found from the time delay $\Delta t$, between any pairs of the light signal. For example, the time delay between the signal at level $i_1$ and $i$ is illustrated in FIG. 3 and readily can be determined by the data acquisition system use of the time delay between the total intensities of the signals at these two levels. Thus, the angular velocity of the lightning ($\omega$) becomes $\omega = d/f\Delta t$, and, if the range, R, to the discharge is known, the vertical speed of propagation of the lightning is $V = \omega r$.

Figure 4:
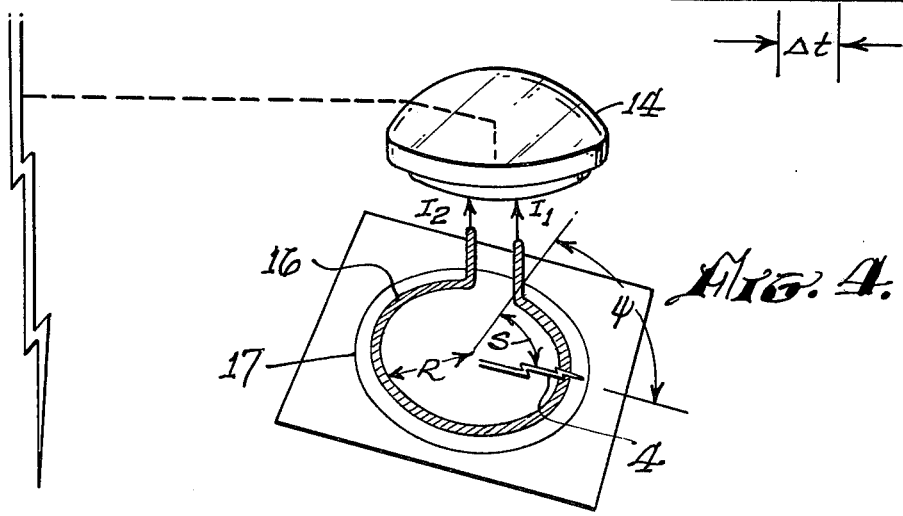
FIG. 4 is a modification of the system adapted to monitor lightning discharges occurring near the horizon throughout approximately a 360° field of view.

The modification illustrated in FIG. 4 is an arrangement primarily intended to locate lightning discharges occurring near the horizon. Such an arrangement is useful in monitoring a plurality of critical objectives which may be spread over widely dispersed locations representing substantially a 360° field of view relative to the single-axis photodiode. As shown, the FIG. 4 arrangement utilizes an all-sky fisheye lens 14 to focus lightning discharges occurring near the horizon on a ring-shaped, single-axis position-sensing photodiode 16. However, diode 16, aside from its ring-shaped, is similar in function to the elongate photodiode shown in FIG. 1. The photodiode produces a pair of output currents $I_1$ and $I_2$ which can be applied through a filtering capacitor to a date acquisition system in the manner illustrated in FIG. 1. FIG. 4 further identifies the ring-shaped photodiode as having a radius R and the arrangement further achieves its purpose by determining the angle to discharge $\psi$. Circle 17 shown on FIG. 4 represents the horizon image viewed by the fisheye lens.

In analyzing the output data of the ring-shaped photodiode of FIG. 4, the following relationships will be found to apply and, again, it will be noted that these relationships permit the use of simple analog acquisition circuits since the information applied to the acquisition system is wholly in the form of analog outputs:

$$I_T = I_1 + I_2$$
$$S = 2\pi R(I_2/I_T) = 2\pi R (1 - I_1/I_T)$$
$$\psi(\text{in radians}) = S/R = 2\pi(I_2/I) = 2\pi(1 - I_1/I)$$
$$\psi(\text{in degrees}) = 360(I_2/I) = 360(I - I_1/I)$$

The systems which have been described are particularly useful for real time monitoring of lightning discharges occurring within the vicinity of particular critical objectives and, as contrasted with the present methods which involve primarily the use of photography, sophisticated T.V. systems or crossed-loop direction finders, etc., the present system permits real time, accurate determinations using simple, relatively low-cost instrumentation well adapted for field experimental use. Further, the use of the simple photodiodes which are capable of operating for unusually long periods at relatively low power permit the monitoring both during daylight and at night over long periods of time. In particular, the arrangement achieves unusually high angular resolution as compared with other possible arrangements of this or other types. However, other applications of the system are conceivable and, in fact, the simplicity and ease of operation suggest the possible use of these detectors as surveying instruments or the like.

Obviously many modifications and variations of the present invention are possible in the light of the above teachings. It is therefore to be understood that within the scope of the appended claims the invention may be practiced otherwise than as specifically described.

I claim:

1. Photoelectric apparatus for monitoring the occurrence of a lightning discharge in the vicinity of a particular objective comprising:
   a continuous linear single-axis position-sensing photodiode detector means of a length L deployed a predetermined distance from said objective;
   an optical objective lens having a predetermined field of view for imaging a lightning discharge occuring within its view as a focused narrow-line channel bisecting said length L at varying locations dependent upon the location of the lightning discharge; said detector means being formed for producing two signal outputs each corresponding in magnitude to said variable location of said bisecting channel;
   said lens and detector means each being relatively disposed one to the other and both being oriented relative to said objective for focusing said field of view on said detector means;
   data acquisition means, and
   circuit means coupling said two detector means outputs to said acquisition means, said circuit means including background filtering means for passing to said acquisition means signal information substantially wholly representative of the optical transients of the lightning discharge,
   said acquisition means being responsive to said filtered information for providing angle to discharge data whereby precise information regarding the proximity of said discharge to said objective and its intensity is provided.

2. The apparatus of claim 1 wherein said objective lens has a field of view of about 40° and an angular resolution in excess of 1/100°.

3. The apparatus of claim 2 where said detector means includes:
   a plurality of said linear single-axis photodiode detectors disposed planularly at the focal length of said lens a known distance (R) from said objective and at a known spacing (d) one from the other, said planular orientation causing a vertically-oriented lightning discharge to impinge as a bisecting channel successively upon each member of said array with a time lag T, and
   said circuit means coupling each member of said array to said data acquisition means for applying said time lag information to said acquisition means for permitting determination of the vertical speed of propagation of said lightning discharge.

* * * * *